United States Patent [19]

Egli et al.

[11] 4,217,220
[45] Aug. 12, 1980

[54] ROTARY FILTER

[75] Inventors: René Egli, Sins; Hans-Rudolf Staub, Eggenwil; Kurt Feneberger, Sins, all of Switzerland

[73] Assignee: Lonza Ltd., Valais, Switzerland

[21] Appl. No.: 914,137

[22] Filed: Jun. 9, 1978

[30] Foreign Application Priority Data

Jun. 9, 1977 [CH] Switzerland .......................... 7113/77

[51] Int. Cl.² ............................................. B01D 35/16
[52] U.S. Cl. ........................................ 210/79; 210/413
[58] Field of Search .......................... 210/79, 413–415, 210/332, 396, 407, 408

[56] References Cited

U.S. PATENT DOCUMENTS

| 336,425 | 2/1886 | Ockershausen ................... 210/413 X |
| 992,512 | 5/1911 | Madden .............................. 210/408 |
| 1,000,086 | 8/1911 | Goetz et al. .......................... 210/414 |
| 2,022,016 | 11/1935 | Wardle ................................ 210/332 |
| 2,606,663 | 8/1952 | Blackman et al. ............... 210/413 X |

FOREIGN PATENT DOCUMENTS

| 400213 | 7/1909 | France ...................................... 210/408 |
| 1237317 | 6/1960 | France ...................................... 210/414 |

Primary Examiner—William A. Cuchlinski, Jr.
Attorney, Agent, or Firm—Fisher, Christen & Sabol

[57] ABSTRACT

A perpendicular-standing rotary filter for the continuous separation of coarse particles from a suspension. The rotary filter has an upper part which includes a cylindrical filter basket disposed centrally in a cylindrical jacket. A chamber for the filtered material is formed by the space between the cylindrical jacket and the filter jacket of the filter basket. At least one centrally-located rotable scraper is continuously forced by means of a compression spring against the filter jacket. The rotary filter also has a lower part which includes a sump chamber in which at least one rotable stirring sheet is centrally disposed and which continuously presents (or always contains) one outlet for the filtered material and one outlet for the separated material. Preferably at least three scrapers are disposed in the filter basket. Also, preferably at least three stirring sheets are disposed in the sump chamber. The rotary filter can be a pressure filter.

20 Claims, 2 Drawing Figures

ROTARY FILTER

BACKGROUND OF THIS INVENTION

1. Field of this Invention

This invention relates to a vertical- or perpendicular-standing rotary filter for the continuous separation of coarse particles from a suspension. This invention also relates to a process utilizing such a perpendicular-standing rotary filter.

2. Prior Art

In producing suspensions, which are to contain solids in certain very small grain sizes, it is often not possible to avoid larger particles being suspended along with the desired smaller particles. The separation of these undesirable coarse portions is accomplished, for example, by filtering. In some cases with certain types of suspensions, especially with suspensions of solid lubricants, such as, graphite, difficulties arise because the screen openings plug up during filtering.

BROAD DESCRIPTION OF THIS INVENTION

An object of this invention is to provide a rotary filter which avoids the above-mentioned disadvantages of the prior art. Another object of this invention is to provide a process for using such rotary filter. Other objects and advantages of this invention are set out herein or are obvious herefrom to one ordinarily skilled in the art.

The advantages and objects of this invention are achieved by the process of this invention.

This invention involves a rotary filter, which is vertical or perpendicular standing. The rotary filter has an upper part which consists of a round filter basket (104) centrally disposed in a cylindrical jacket (103). A chamber for the filtered materials (112) is formed by the space between the cylindrical jacket (103) and the filter jacket of the cylindrical (round) filter basket (104). There is at least one centrally-located rotatable processing scraper (105), which is continuously pressed or forced against the filter jacket (104) by means of an compression spring (106). The rotary filter also has a lower part consisting of a sump chamber (113) in which at least one rotable stirring sheet (111) is centrally disposed or located Sump chamber (113) has one outlet for the filtered material (116) and one outlet for the separated material (114).

It is particularly effective to provide several, preferably at least three scrapers (105), and likewise several, preferably at least three, stirring sheets (111).

The rotary filter of this invention can also be developed as a pressure filter. In such case, corresponding gaskets, which are suitable for the operating pressure, must be built into the rotary filter.

This invention also involves a process for continuously separating coarse particles from a suspension using the rotary filter of this invention.

DETAILED DESCRIPTION OF THIS INVENTION

Figure 1:
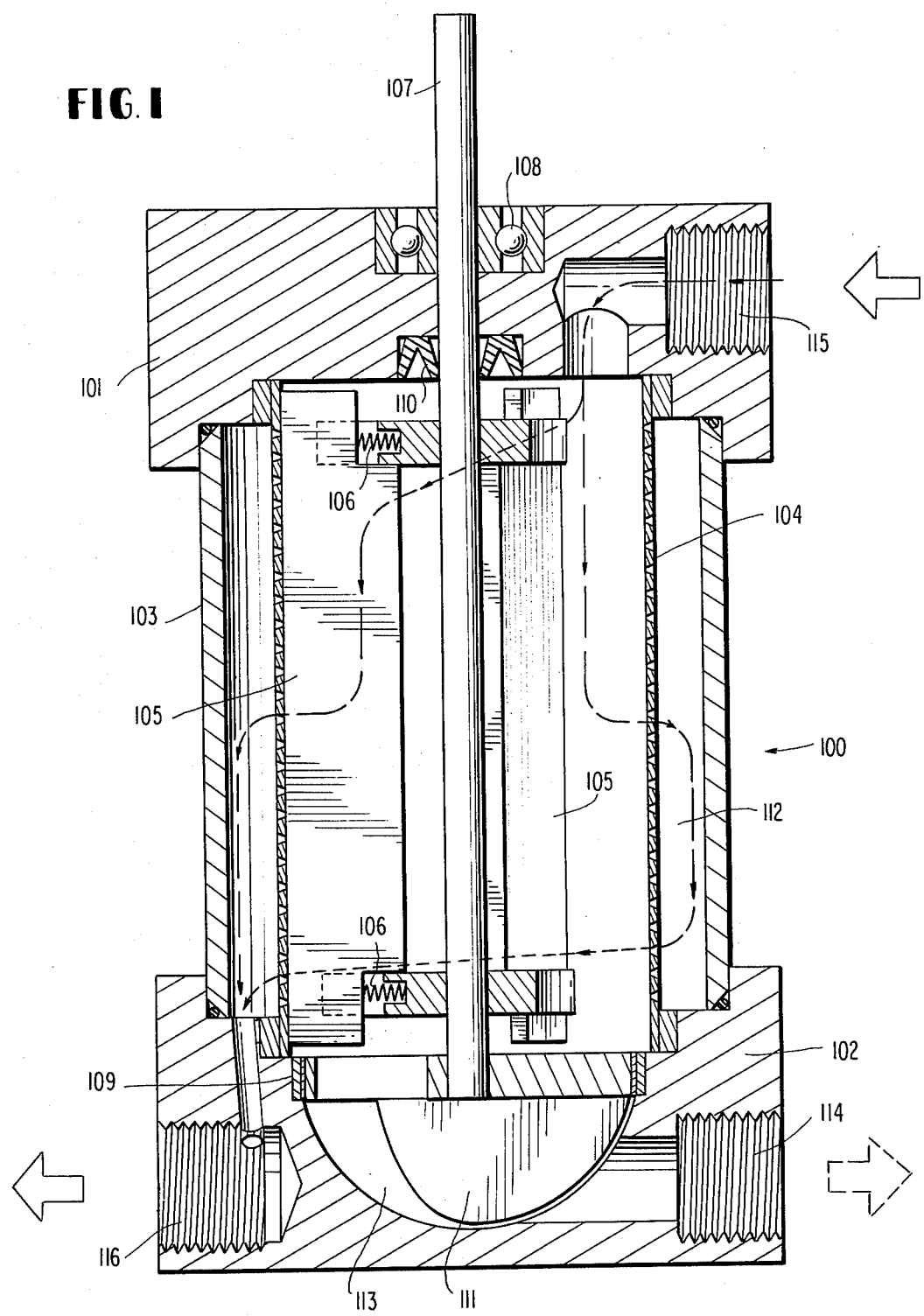

As used herein, all ratios, percentages and parts are on a weight basis unless otherwise stated herein or obvious to one ordinarily skilled in the art.

Figure 2:
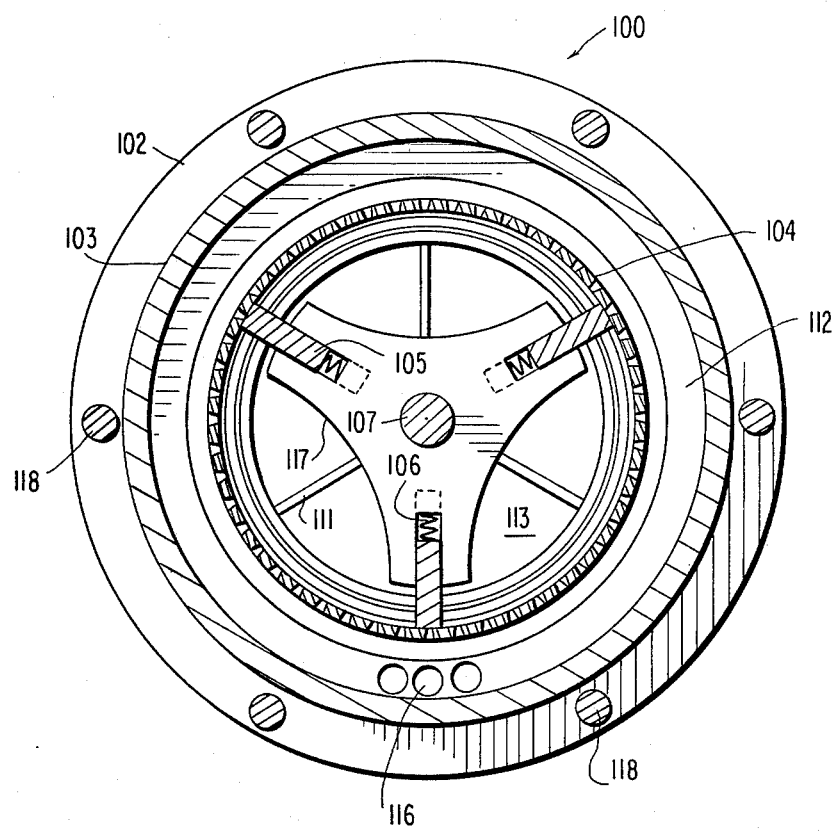

In the drawings:

FIG. 1 is a cross-sectional front view of the rotary filter of this invention; and FIG. 2 is a cross-sectional top view of the rotary filter shown in FIG. 1.

As shown in FIG. 1, a rotary filter 100 includes upper part 101 of the housing and lower part 102 of the housing, between which cylindrical jacket 103 is disposed (located). Cylindrical (round) filter basket 104, which has a smaller diameter than jacket 103, has been centrally disposed in relation to jacket 103. The space between cylindrical filter basket 104 and jacket 103 is the chamber for filtered material 112. The openings of the screen of cylindrical filter 104, which preferably are conically disposed in the direction of filtration, and the determining screen openings, with regard to diameter, lie on the inside wall of the filter basket, are dimensioned such that the undesirable coarse particles are held back on the inside.

Roller bearings 108, friction bearings 109 and scrapers (cleaning lamellae) 105 are attached to centrally-disposed rotable shaft 107. Scrapers 105 are forced by means of compression springs 106 against the screen jacket of cylindrical filter basket (body) 104. During rotation, scrapers 105 scrap the coarse particle from the screen. The coarse particles then travel down to sump chamber 113. In order to avoid any deposit of these coarse particles in sump chamber 113, they are kept in suspense by stirring sheets 111 attached at the lower end of shaft 107. The coarse particles leave the filteration installation by way of the outlet for separated material 114.

The filtered material, which has passed through the filter, reaches the outlet for filtered material 116 via chamber 112.

Preferably, scrapers 105 and compression springs 106 are seated in star-type reel stand 117, which is attached to shaft 107. 118 are attachment screws. Gaskets 110, in constructing the filter, must be adapted as pressure filters to the operating pressure. Effectively, they should be able to absorb a pressure of up to 60 bar.

FIG. 1 shows with arrows the path of the suspension through the filter, beginning at inlet 115.

The shaft with the scrapers is driven effectively by a motor (not shown) which is operated electrically or hydraulically, advantageously at a speed of 2 to 25 r.p.m. and preferably of 7 to 10 rpm.

The material to be used is not critical and must be adaptable to the suspension.

What is claimed is:

1. A perpendicular-standing rotary filter for the continuous separation of coarse particles from a suspension which comprises an upper part which consists of (i) a cylindrical filter basket having a filter jacket, (ii) a cylindrical jacket, the filter basket being centrally disposed in the cylindrical jacket, the suspension being fed into the cylindrical filter basket, (iii) a chamber for the filtered material formed by the space between the inner surface of the cylindrical jacket and the outer surface of the filter jacket of the filter basket, and (iv) at least one centrally-located rotable scraper, which is continuously forced by means of a compression spring against the inner surface of the filter jacket, and a lower part which consists of (a) a sump chamber in which at least one rotable stirring sheet is centrally disposed, (b) one outlet for the filtered material and (c) one outlet for the separated material, the sump chamber being continuously in communication with the outlet for the separated material.

2. A rotary filter as claimed in claim 1 wherein at least three scrapers are disposed in the filter basket.

3. A rotary filter as claimed in claim 1 wherein at least three stirring sheets are disposed in the sump chamber.

4. A rotary filter as claimed in claim 1 wherein the rotary filter is a pressure filter.

5. A rotary filter as claimed in claim 1 wherein the filter jacket has circular pores, which are widened conically in the direction of the filteration flow, the narrow diameters of such pores occurring on the inner wall of the filler jacket.

6. A rotary filter as claimed in claim 5 wherein at least three scrapers are disposed in the filter basket, at least three stirring sheets are disposed in the sump chamber and the rotary filter is a pressure filter.

7. A process which comprises continuously separating coarse particles from a suspension using the rotary filter of claim 1.

8. A process as claimed in claim 7 wherein the coarse particles are lubricant particles.

9. A process as claimed in claim 8 wherein the lubricant particles are graphite particles.

10. A process as claimed in claim 7 wherein at least the one scrapper rotates at a speed between 2 and 25 r.p.m.

11. A perpendicular-standing rotary filter for the continuous separation of coarse particles from a suspension which comprises an upper part which comprises (i) a cylindrical filter basket having a filter jacket, (ii) a cylindrical jacket, the filter basket being centrally disposed in the cylindrical jacket, said suspension being fed into said cylindrical filter basket, (iii) a chamber for the filtered material formed by the spaces between the inner surface of the cylindrical jacket and the outer surface of the filter jacket of the filter basket, and (iv) at least one centrally-located rotable scraper which is continuously forced by means of a compression spring against the inner surface of the filter jacket, and a lower part which comprises (a) a sump chamber in which at least one rotable stirring sheet is centrally disposed, (b) one outlet for the filtered material and (c) one outlet for the separated material, the sump chamber being continuously in communication with the outlet for the separated material.

12. A rotary filter as claimed in claim 11 wherein at least three scrapers are disposed in the filter basket.

13. A rotary filter as claimed in claim 11 wherein at least three stirring sheets are disposed in the sump chamber.

14. A rotary filter as claimed in claim 11 wherein the rotary filter is a pressure filter.

15. A rotary filter as claimed in claim 11 wherein the filter jacket has circular pores, which are widened conically in the direction of the filteration flow, the narrow diameters of such pores occurring on the inner wall of the filter jacket.

16. A rotary filter as claimed in claim 15 wherein at least three scrapers are disposed in the filter basket, at least three stirring sheets are disposed in the sump chamber, and the rotary filter is a pressure filter.

17. A process which comprises continuously separating coarse particles from a suspension using the rotary filter of claim 11.

18. A process as claimed in claim 17 wherein the coarse particles are lubricant particles.

19. A process as claimed in claim 18 wherein the lubricant particles are graphite particles.

20. A process as claimed in claim 17 wherein at least the one scraper rotates at a speed between 2 and 25 r.p.m.

* * * * *